(12) United States Patent
Budampati et al.

(10) Patent No.: US 8,811,231 B2
(45) Date of Patent: *Aug. 19, 2014

(54) WIRELESS TRANSMITTER INITIATED COMMUNICATION SYSTEMS

(75) Inventors: Ramakrishna S. Budampati, Maple Grove, MN (US); Patrick S. Gonia, Maplewood, MN (US); Soumitri N. Kolavennu, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 768 days.

This patent is subject to a terminal disclaimer.

(21) Appl. No.: 11/163,544

(22) Filed: Oct. 21, 2005

(65) Prior Publication Data

US 2007/0091824 A1    Apr. 26, 2007

(51) Int. Cl.
*H04L 12/28* (2006.01)

(52) U.S. Cl.
USPC .......................................................... 370/255

(58) Field of Classification Search
USPC .......................................................... 370/255
See application file for complete search history.

(56) References Cited

U.S. PATENT DOCUMENTS

| | | |
|---|---|---|
| 3,643,183 A | 2/1972 | Geffe |
| 3,715,693 A | 2/1973 | Fletcher et al. |
| 3,758,885 A | 9/1973 | Voorman et al. |
| 4,264,874 A | 4/1981 | Young |
| 4,529,947 A | 7/1985 | Biard et al. |
| 4,614,945 A | 9/1986 | Brunius et al. |
| 4,812,785 A | 3/1989 | Pauker |
| 4,843,638 A | 6/1989 | Walters |
| 5,392,003 A | 2/1995 | Nag et al. |
| 5,428,602 A | 6/1995 | Kemppainen |
| 5,428,637 A | 6/1995 | Oliva, Jr. et al. |
| 5,430,409 A | 7/1995 | Buck et al. |
| 5,438,329 A | 8/1995 | Gastouniotis et al. |
| 5,451,898 A | 9/1995 | Johnson |

(Continued)

FOREIGN PATENT DOCUMENTS

| | | |
|---|---|---|
| CH | 673184 | 2/1990 |
| DE | 4344172 | 6/1995 |

(Continued)

OTHER PUBLICATIONS

Bluetooth, "Overview of Operations" Bluetooth SIG, Inc., retrieved from Internet Aug. 10, 2010 (http://www.bluetooth.com/English/Technology/Works/Pages/Overview_of_Operation.aspx).*

(Continued)

*Primary Examiner* — Andrew Chriss
(74) *Attorney, Agent, or Firm* — Seager Tufte & Wickhem LLC (57) ABSTRACT

Wireless communication systems using transmitter initiated communications methods. Several devices in the system listen by following a common frequency hopping sequence. When communication is desired, a transmitting device sends a request to send signal to an addressee; if available, the addressee sends a clear to send signal, and the transmitting device and the addressee then perform communications using a separate frequency hopping sequence. Methods for adding new devices are also included. In an example, a new device uses a discovery frequency hopping sequence to ping a number of frequencies until the common frequency hopping sequence is discovered. In another example, a new device listens on a single frequency forming part of the common frequency hopping sequence until the common frequency hopping sequence overlaps the single frequency.

19 Claims, 10 Drawing Sheets

(56) References Cited

U.S. PATENT DOCUMENTS

| | | | |
|---|---|---|---|
| 5,481,259 | A | 1/1996 | Bane |
| 5,642,071 | A | 6/1997 | Sevenhans et al. |
| 5,659,303 | A | 8/1997 | Adair, Jr. |
| 5,726,603 | A | 3/1998 | Chawla et al. |
| 5,767,664 | A | 6/1998 | Price |
| 5,809,013 | A | 9/1998 | Kackman |
| 5,847,623 | A | 12/1998 | Hadjichristos |
| 5,963,650 | A | 10/1999 | Simionescu et al. |
| 5,982,807 | A * | 11/1999 | Snell ............................ 375/146 |
| 6,052,600 | A | 4/2000 | Fette et al. |
| 6,058,137 | A | 5/2000 | Partyka |
| 6,088,595 | A | 7/2000 | Ciccone et al. |
| 6,091,715 | A | 7/2000 | Vucetic et al. |
| 6,175,860 | B1 | 1/2001 | Gaucher |
| 6,353,846 | B1 | 3/2002 | Fleeson |
| 6,366,622 | B1 | 4/2002 | Brown et al. |
| 6,414,963 | B1 | 7/2002 | Gemar |
| 6,624,750 | B1 | 9/2003 | Marman et al. |
| 6,768,901 | B1 | 7/2004 | Osborn et al. |
| 6,785,255 | B2 | 8/2004 | Sastri et al. |
| 6,823,181 | B1 | 11/2004 | Kohno et al. |
| 6,836,506 | B2 | 12/2004 | Anderson |
| 6,859,463 | B1 * | 2/2005 | Mayor et al. .................. 370/445 |
| 6,901,066 | B1 | 5/2005 | Helgeson |
| 7,031,945 | B1 * | 4/2006 | Donner ........................... 705/64 |
| 2002/0011923 | A1 | 1/2002 | Cunningham et al. |
| 2002/0061744 | A1 * | 5/2002 | Hamalainen et al. ......... 455/426 |
| 2002/0085622 | A1 | 7/2002 | Dhar et al. |
| 2002/0113735 | A1 * | 8/2002 | Spratt ............................ 342/464 |
| 2002/0141479 | A1 * | 10/2002 | Garcia-Luna-Aceves et al. ............................ 375/132 |
| 2002/0181435 | A1 * | 12/2002 | Miklos et al. ................. 370/348 |
| 2003/0053555 | A1 | 3/2003 | McCorkle et al. |
| 2003/0198280 | A1 | 10/2003 | Wang et al. |
| 2004/0185857 | A1 * | 9/2004 | Lee et al. ...................... 455/445 |
| 2004/0253996 | A1 | 12/2004 | Chen et al. |
| 2005/0280546 | A1 * | 12/2005 | Ganley et al. ............... 340/573.4 |
| 2005/0281215 | A1 | 12/2005 | Budampati et al. |

FOREIGN PATENT DOCUMENTS

| | | |
|---|---|---|
| EP | 0607562 | 7/1994 |
| EP | 0893931 | 1/1999 |
| WO | WO 00/70572 | 11/2000 |
| WO | 0237757 | 5/2002 |

OTHER PUBLICATIONS

"Medium Access Control (MAC) and Physical (PHY) Specifications," ANSI/IEEE Std 802.11, pp. 177-179, 1999.
"Product Specification for Advanced Pager Receiver UAA2082", Philips, Integrated Circuits, 41 pages, Jan. 15, 1996.
"ZigBee Wireless Networking Software," EmberNet ZigBee, 2 pages, prior to Jun. 17, 2005.
Abidi, "Direct-Conversion Radio Transceivers for Digital Communications," IEEE Journal of Solid-State Circuits, vol. 30, No. 12, pp. 1399-1410, Dec. 1995.
Abidi, "Upconversion and Downconversion Mixers for CMOS Wireless Transceivers," copyright AAA, 42 pages, 1996.
Chang et al., "A CMOS Channel-Select Filter for a Direct-Conversion Wireless Receiver," IEEE Journal of Solid-State Circuits, vol. 32, No. 5, pp. 722-729, May 1997.
Cheng et al., "TPA: A Time-Based Positioning Scheme for Outdoor Wireless Sensor Networks," IEEE INFOCOM 2004, 12 pages, 2004.
Craig, "Zigbee: Wireless Control That Simply Works," 7 pages, prior to Jun. 17, 2005.
Crols et al., "CMOS Wireless Transceiver Design," Kluwer Academic Publishers, 22 pages, 1997.
http://wiki.personaltelco.net/index.cgi/PhasedArray?action=print, "Phased Array—Personal Telco Wiki," 3 pages, May 2, 2005.
http://www.bamboweb.com/articles/o/s/OSI_model.html, "Bambooweb OSI model," Bambooweb Dictionary, 5 pages, printed May 23, 2005.
http://www.dailywireless.org/modules.php?name=News &file=article&sid=871, "Location by Triangulation—Not," Daily Wireless, 2 pages, printed May 2, 2005.
http://www.unstrung.com/document.asp?site=unstrung&doc_ id15069&page_number=1, 11 pages, printed May 2, 2005.
http://www.zigbee.org/en/about/faq.asp, "Wireless Control That Simply Works," ZigBee Alliance, 8 pages, printed Feb. 2, 2005.
Jung et al., "Improving IEEE 802.11 Power Saving Mechanism," 6 pages, Jul. 7, 2004.
Kinney, "ZigBee Technology: Wireless Control That Simply Works," 20 pages, Oct. 2, 2003.
Lee, "The Design of CMOS Radio-Frequency Integrated Circuits," Cambridge University Press, 42 pages, 1998.
Milstein, "Wideband Code Division Multiple Access," IEEE Journal on Selected Areas in Communications, vol. 18, No. 8, pp. 1344-1354, Aug. 2000.
Moulding et al., "Gyrator Video Filter IC with Automatic Tuning," IEEE Journal of Solid-State Circuits, vol. SC15, No. 6, Dec. 1980, pp. 963-968.
Nasipuri et al., "A Directionality Based Location Discovery Scheme for Wireless Sensor Networks," pp. 105-111, prior to Jun. 17, 2005.
Razavi, "Design Considerations for Direct-Conversion Receivers," IEEE Transactions on Circuits and Systems—II: Analog and Digital Signal Processing, vol. 44, No. 6, pp. 428-435, Jun. 1997.
Rofougaran et al., "A 1 GHz CMOS RF Front-End IC for a Direct-Conversion Wireless Receiver," IEEE Journal of Solid-State Circuits, vol. 31, pp. 880-889, Jul. 1996.
Rofougaran et al., "A 900 MHz CMOS RF Power Amplifier with Programmable Output Power," Proceedings VLSI Circuits Symposium, Honolulu, 4 pages, Jun. 1994.
Savvides et al., "Dynamic Fine-Grained Localization in Ad-Hoc Networks of Sensors," pp. 166-179, prior to Jun. 17, 2005.
Want et al. "The Active Badge Location System," 7 pages, prior to Jun. 17, 2005.
Wilson et al., "A Single-Chip VHF and UHF Receiver for Radio Paging", IEEE Journal of Solid State Circuits, vol. 26, No. 12, 9 pp. 1944-1950, Dec. 1991.
Bowman et al., "Channel Access for Simultaneous Voice and Data Transmissions in a Multiple-Hop Packet Radio Network," IEEE, pp. 193-197, 1998.
Tang et al., "Hop reservation multiple access for multichannel packet radio networks," Elsevier Science B.V., Computer Communications 23, pp. 877-886, 2000.

* cited by examiner

Figure 8

WIRELESS TRANSMITTER INITIATED COMMUNICATION SYSTEMS

CROSS REFERENCE TO RELATED APPLICATIONS

The present invention is related to copending U.S. patent application Ser. No. 11/163,545, entitled WIRELESS TRANSMITTER INITIATED COMMUNICATION METHODS, filed on even date herewith.

FIELD

The present invention is related to the field of wireless communication networks. More specifically, the present invention relates to spread spectrum communication methods and systems incorporating such methods, including Frequency Hopping Spread Spectrum and Direct Sequence Spread Spectrum approaches.

BACKGROUND

Wireless networking entails communication between a number of devices within an uncontrolled environment. Such communication is often interference limited. While noise produced external to the system is outside the control of system designers, data collisions within a system simply compound the problem. New methods for avoiding packet collisions arising as a result of network operations are desired.

SUMMARY

In a first embodiment, the present invention includes a wireless system including a number of peer devices, wherein the peer devices are configured to make use of a common frequency hopping pattern for enabling broadcast communications to each peer device as well as allowing the peer devices to contact one another for the purpose of initiating a peer-to-peer communication. The peer-to-peer communication takes place using an individual frequency hopping pattern defined by one of the peer devices involved in the peer-to-peer communication.

In another embodiment, the wireless system may make use of code division multiple access (CDMA) codes, wherein a common CDMA spreading code is used by the peer devices for enabling broadcast communications and allowing the peer devices to contact one another for the purpose of initiating a peer-to-peer communication. Peer-to-peer communication may then take place using an individual CDMA code defined by one of the peers.

The illustrative embodiment may also include methods for admitting a new device into the network. The new device may execute a communication observation method that assures that it will observe a communication by an existing peer device, if such is available/accessible. The new device will listen at a channel configured to capture communication. In one example, the system has a common frequency pattern and a system cycling rate. The new device listens to a single channel for an amount of time sufficient to assure that the single channel will, eventually, correspond to the channel in use for the system. Alternatively, the new device may execute a pattern covering several channels for such listening, the pattern designed to assure that the listened-to channels will overlap a common channel for system communication. In either succession, the new device captures clock information and phase information from a captured signal, enabling the new device to follow the common pattern and synchronize with the system clock.

In yet another embodiment, a new device executes a beacon generation succession on a number of channels designed to assure that the beacon will eventually be heard by a peer device. For example, the beacon may be produced by following a frequency pattern until the beacon is acknowledged or the new device times out. The acknowledge signal may contain specific information including, for example, clock information allowing the new device to synchronize with the system common clock. The acknowledge signal may also indicate to the new device information related to the system, for example, indicating the number of associated peer devices in the neighborhood, and/or addresses of such peer devices.

In a further embodiment, the present invention also includes defining a number of time frames each including discovery time period during which the devices in the communication network all simply listen to determine whether a new device has entered the network neighborhood. In some examples, the devices simply listen on the common network frequency for such new devices, while in another example, each device may listen to a different frequency than at least one of its neighboring devices in order that the system may listen for a new device across a number of frequencies.

DETAILED DESCRIPTION

The following detailed description should be read with reference to the drawings. The drawings, which are not necessarily to scale, depict illustrative embodiments and are not intended to limit the scope of the invention.

As used herein, a frequency or channel succession indicates the use of a first frequency followed by the use of a second frequency. The first and second frequencies do not have any necessary connection. In fact in some regulatory domains, the relationship between successive frequencies must perform as if they were random e.g be pseudorandom. However for consideration in this invention the configuration of a frequency succession may be performed in any suitable fashion.

Figure 1:
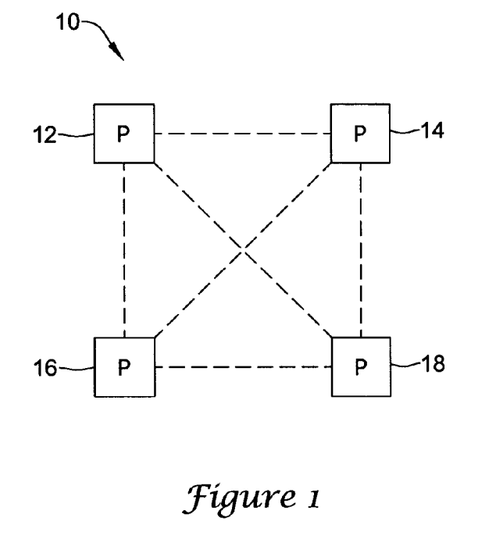
FIG. 1 is a diagram of a wireless communication system.

FIG. 1 is a diagram of a wireless communication system. The system 10 includes a number of peer devices 12, 14, 16, 18 which may, as indicated by the dashed lines, wirelessly communicate with one another. Each of the peer devices 12, 14, 16, 18 may, in its physical embodiment, take any suitable form. In some embodiments, at least one of the peer devices 12, 14, 16, 18 is further coupled to another system such as an LAN, a server, a computer, or the like.

If desired, at any given time, one of the peer devices 12, 14, 16, 18 such as peer device 16 may be designated as a "central" node/device to provide the system 10 with a point of reference for time synchronization purposes. Also, if desired, the peer devices may be configured to allow one or more of the peer devices to generate a broadcast communication. For example, a peer device 12 may generate a broadcast signal to the other peer devices 14, 16, 18 for configuration or other purposes. Although such broadcast signals may be enabled, communication in the system is also performed on a peer-to-peer basis between a selected pair of peer devices 12, 14, 16, 18, as further explained with reference to FIGS. 2A-2B.

Figure 2A:
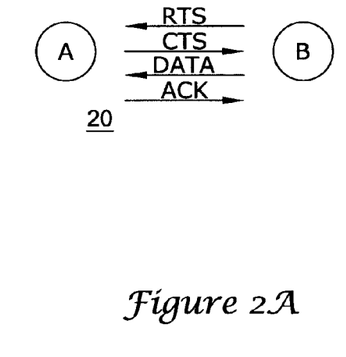
FIGS. 2A and 2B are a diagram and a timing chart showing wireless communication between devices A and B.
Figure 2B:
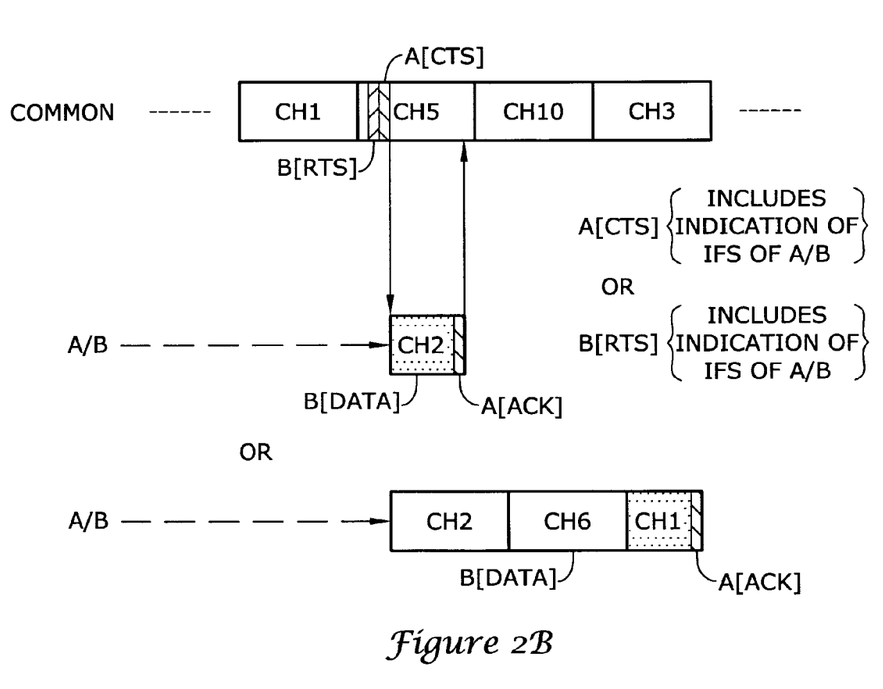

FIGS. 2A and 2B are a diagram and a timing chart showing wireless communication between devices A and B. Referring to FIG. 2A, devices A, B communicate wirelessly in a medium 20 allowing such communications. To initiate a data communication, device B sends a request to send RTS signal to A. The RTS may include addressing data indicating which device among the devices accessible in medium 20 is the intended destination for communication by B. If A receives and correctly processes the RTS and is in a state allowing A to receive a message from B, A responds with a clear to send CTS signal. The CTS signal may include data indicating to B that A has received the RTS and is prepared to receive data from B. B then wirelessly communicates information DATA to A. If A correctly receives the DATA signal, A responds with an acknowledgement ACK.

FIG. 2B illustrates the timing and frequencies at which communications occur. The line labeled COMMON indicates a common frequency sequence followed by the devices within the system. As can be seen, the common frequency sequence follows a pattern progressing at timed intervals from one frequency or channel to another frequency or channel. For the illustrated embodiment, the sequence goes from CH1 to CH5 to CH10 to CH3. The actual sequence used can be selected as desired. The frequency sequence selected may be, for example, generated by each peer device acting independently but using a common e.g. pseudorandom algorithm. The frequency for communication may be selected using a frequency hopping protocol or a code division multiple access protocol, for example. The present invention is not, however, generally limited to one specific protocol for defining or generating the frequency sequence. The duration of frequency hops may vary as desired within regulatory or other constraints.

As indicated within the COMMON frequency sequence, the communication represented in FIG. 2A occurs initially in the COMMON frequency sequence. As shown, while the COMMON sequence is using CH5, B sends an RTS to A, represented as B[RTS]. A then responds, also using CH5, with a CTS signal sent to B, represented at A[CTS]. A and B then use a different frequency, shown as CH2, for transmitting and acknowledging data transmission, as indicated following the line labeled A/B. A and B then resume listening/communicating using the COMMON frequency sequence.

As shown in FIG. 2B, the selection of frequency A/B can be determined by A or by B. For example, the A[CTS] signal may include an indication of the channel for A/B. Alternatively, the B[RTS] signal may include an indication of the channel for A/B. Depending on the length of the communications between A and B, the frequency A/B may instead be an individual frequency sequence [IFS] following a number of frequencies.

Figure 3:
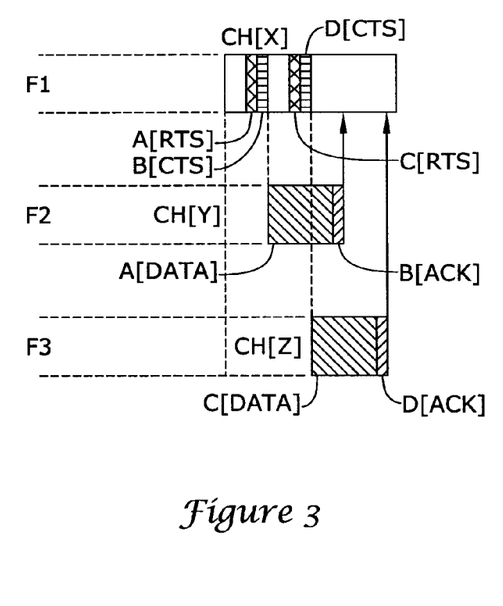
FIG. 3 is a partial timing chart for a wireless communication system.

FIG. 3 is a simplified timing chart for a wireless communication system. The timing chart is simplified by representing the available frequencies using only three frequencies, F1, F2, F3. F1 represents a common frequency followed by several peer devices, for example, the peer devices 12, 14, 16, 18 represented in FIG. 1. F1 may be part of a frequency sequence. Following F1, a first device A generates a request to send A[RTS], which is sent to a second device labeled for illustrative purposes as B. If B is available to communicate and correctly receives the A[RTS] signal, then B generates a clear to sent B[CTS] signal. In similar fashion to FIG. 2A-2B, A and B then go to another frequency F2 to perform communications of A[DATA] and B[ACK].

Meanwhile, in the common frequency F1, another device C generates a C[RTS] signal addressed to another device D. If D is available and correctly receives the C[RTS] signal, D will generate a clear to send signal D[CTS]. C and D then go to yet another frequency F3 to perform data communications including C[DATA] and D[ACK].

The frequencies chosen for data communication F2, F3 are, in a first embodiment, chosen independently by one of the communicating devices and designated in either the RTS or CTS signals. In a second embodiment, the CTS/RTS signals generated between the peer devices are generated with sufficient power to enable devices that are not the intended addressees to receive the signals. By so doing, the other devices can be made aware of which frequencies are in use for data communications off of the common frequency. For example, if B designates the frequency for A/B communications as F2 in the B[CTS] signal, then C and D may observe the CTS signal to determine that frequency F2 is at least temporarily in use for data communication between A and B. Therefore, when either of C or D designates a data communications frequency, F2 will not be designated. This function may, for example, time out, such that C and D will not designate F2 for a predefined time period, after which F2 may again be used.

Figure 4:
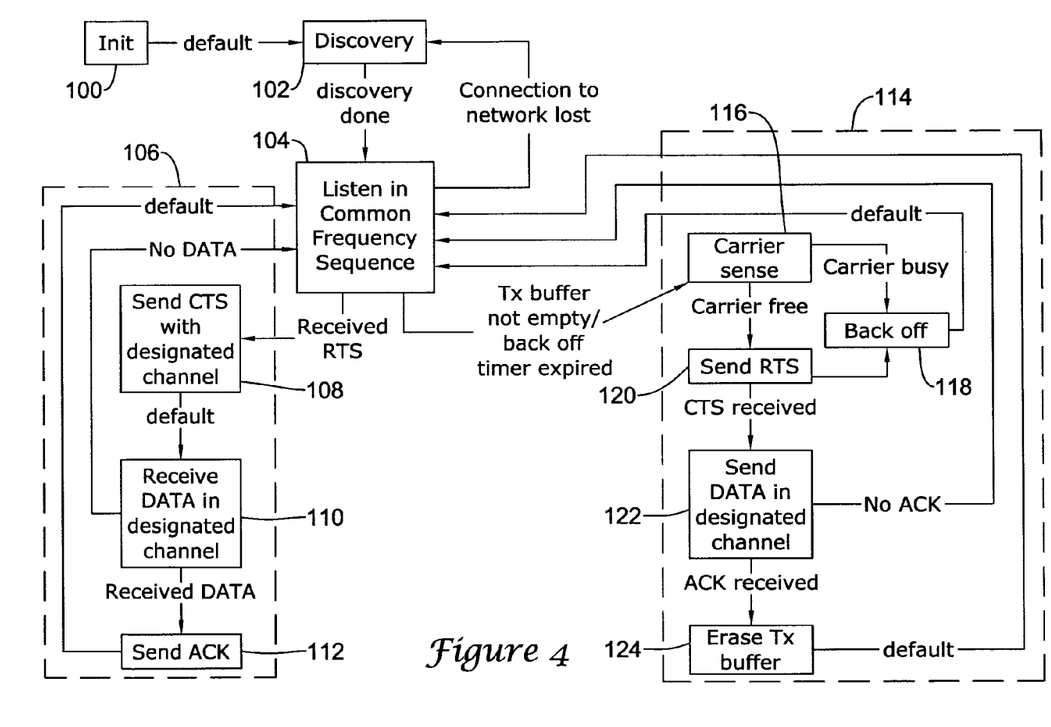
FIG. 4 is a state diagram for wireless communication.

FIG. 4 is a state diagram for wireless communication. From an INIT state 100, the device defaults to a discovery state 102 wherein the device finds and synchronizes with a wireless communications system. When discovery is done, the device enters a listen state 104 wherein the device listens in the common frequency sequence, which periodically changes frequency.

When in listen state 104, if a request to send signal is received from another device, the device will enter a receive state 106. Included in receive state 106 is a state for sending a clear to send (CTS) signal 108. In the illustrative embodiment, the CTS includes the designated channel or frequency sequence for sending data. After the CTS is sent, the device defaults to a state for receiving data 110 in the designated channel. If no data is received, the device reverts to the listen state 104. If data is received, then the device enters a state for sending an acknowledgement ACK, as shown at 112. The device then defaults back to the listen state 104.

If, while in the listen state 104, the transmission buffer is no longer empty (indicating that there is data to send), or if a back-off timer has expired (indicating that the carrier can be sensed again), the device enters a transmit state 114. While in the transmit state 114, the device enters a carrier sense state 116 for sensing whether the carrier (i.e. the current frequency in the common frequency sequence) is busy or free. If the carrier is busy, the device enters a back off state 118 where a back off timer is set, and reverts to the listen state 104 until the back off timer expires or another RTS event occurs. If, instead, the carrier is free, the device enters a send state 120 for sending a request to send (RTS) signal to another peer device. The device listens for a clear to sent (CTS) signal. If a CTS signal is received, then the device enters another send state 122 for sending DATA. After DATA is sent, the device listens for an acknowledgement (ACK). If no CTS is received, the device again enters the back off state 118, sets the back off timer, and reverts to the listen state 104. After data is sent, if an ACK signal is received in response to DATA, the device erases the transmission buffer, as shown at 124, and defaults back to the listen state 104. If no ACK signal is received, the transmission buffer is not cleared, and the device reverts to the listen state 104 and increments a retry limiter counter associated with that transmit buffer. If the limited retries are exceeded, the buffer is cleared and an internal error may be noted.

Figure 5A:
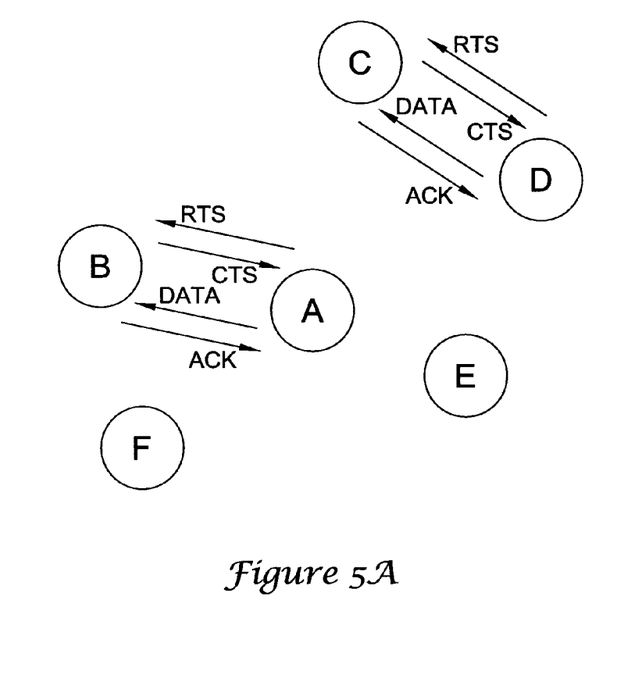
FIGS. 5A and 5B are a diagram and a timing chart for wireless communication.
Figure 5B:
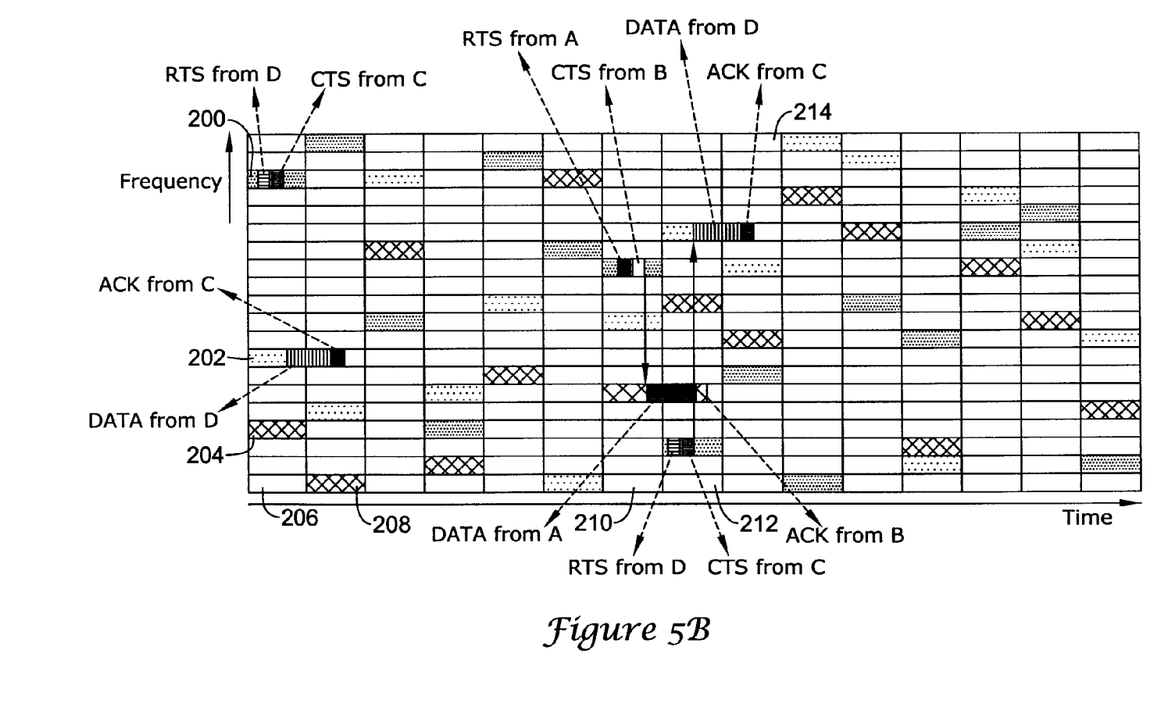

FIGS. 5A-5B are a diagram and a timing chart for wireless communication. As shown in FIG. 5A, the wireless communication system includes a number of devices A-F. Communication occurs, in the relevant time period for the illustrative embodiment, between devices A-B and C-D. As shown by FIG. 5B, a common frequency sequence 200 is followed by each of devices A-F for listening purposes. Each device identifies a second frequency that is an independent frequency, including an independent frequency for C 202 and an independent frequency for B 204. The common frequency 200 and independent frequencies 202, 204 change from communication frame 206 to a next communication frame 208, and so forth. Distinct cross hatching indicates a common frequency sequence 200 used by each existing device in the system. For the embodiment of FIGS. 5A-5B, the individual devices A-F each define an independent frequency for data communication during each frame 206, 208. In other embodiments, the independent frequencies 202, 204 are defined at the time it is determined that communication is desired, rather than at the start of each frame 206, 208.

In the illustrative embodiment, it can be seen that a request to sent (RTS) is sent during a time frame 206 from device D, addressed to device C, at common frequency 200. A clear to send (CTS) signal is then sent in response to the RTS by C, addressed to D, also on the common frequency 200. Once this "handshake" is performed, C and D move to independent frequency for C 202, and perform data transfer using a DATA and ACK signal sequence. It can be seen that C and D remain in the independent frequency for C beyond the end of frame 206 and into the next frame 208. If desired, rather than staying in the same frame, C and D may perform an additional frequency change or hop at the end of frame 206 into the next independent frequency for C.

Similar communications take place later between devices A and B during frames 210-212 and between C and D during frames 212-214. By moving data communication off of the common frequency, the common frequency remains available for the use of other devices in the network for handshaking and/or for broadcast signals.

Figure 6:
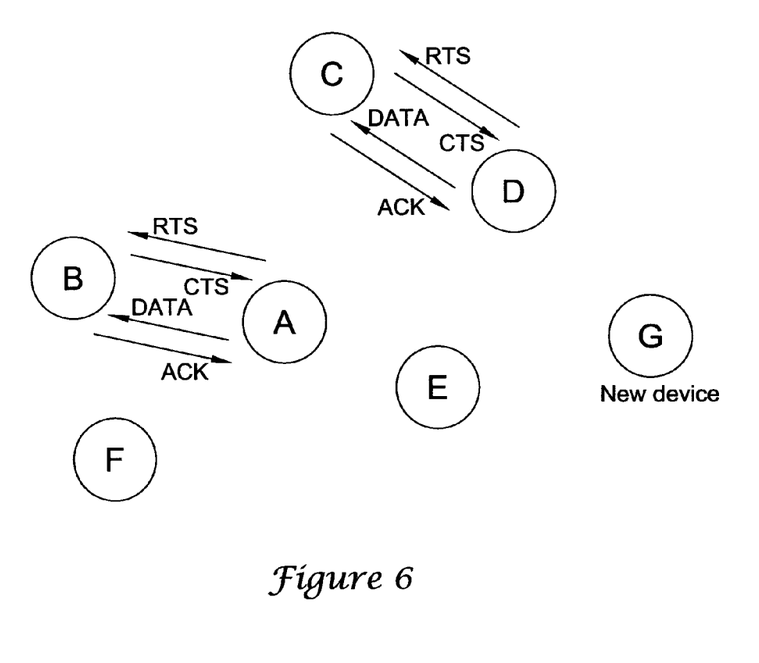
FIG. 6 is a diagram for new device discovery.

FIG. 6 is a diagram for new device discovery. An existing system is shown having devices A, B, C, D, E, and F. New device G has been added to the network, and needs to perform two tasks to initiate itself to the network. First, G needs to become time synchronized with the rest of the network. Second, if G is entering a network, as explained above, where there is a common frequency sequence followed by other network devices, G must determine what the sequence is. As illustrated, communications may take place between other network devices including RTS/CTS exchanges followed by DATA/ACK exchanges. The diagram of FIG. 6 is applicable for either of the methods of FIGS. 7 and 8, which are provided as illustrations. The above methods of network operation need not be limited to networks using these particular discovery methods.

Figure 7:
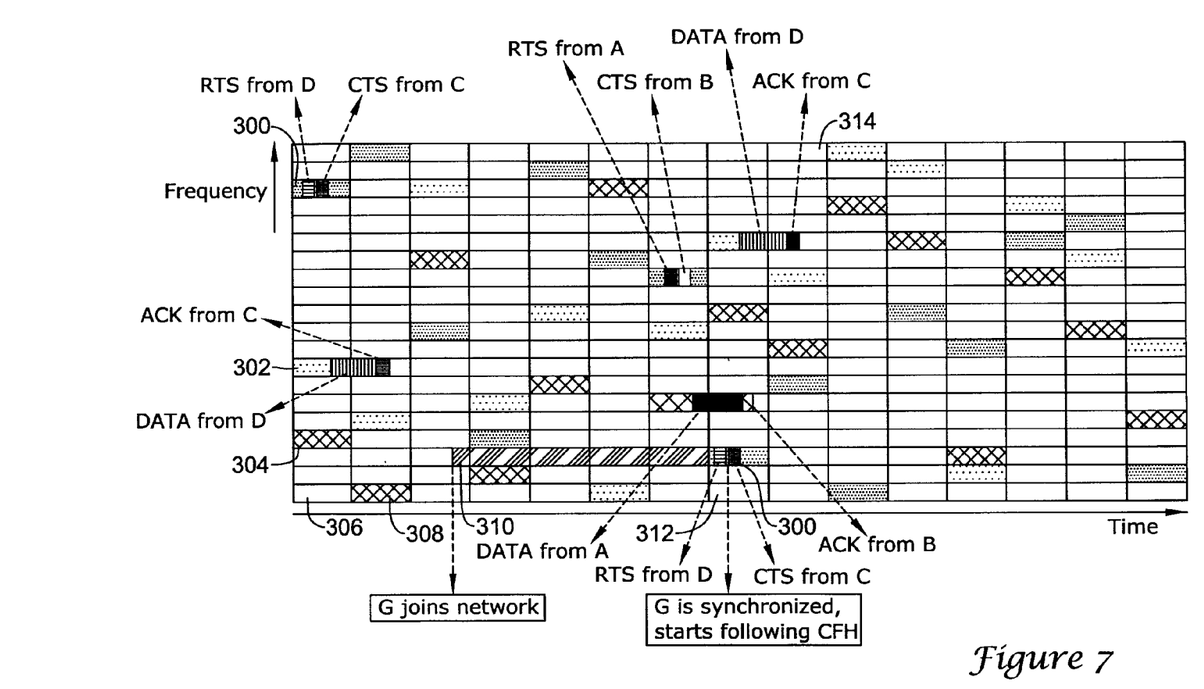
FIG. 7 is a timing chart for a first discovery method.

FIG. 7 is a timing chart for a first discovery method. The timing chart shows that a number of frequencies have been defined (vertical axis) and a number of time blocks are defined for each frequency (horizontal axis). Distinct cross hatching indicates a common frequency sequence 300 used by each existing device in the system, a first individual frequency sequence 302, and a second individual frequency sequence 304.

As shown during time block 306, D generates a RTS signal, addressed to C, on the common frequency sequence 300. C responds in time block 306 with a CTS signal, again using the common frequency sequence 300. After receiving the CTS signal, D uses the second individual frequency sequence 302 to send data, beginning in time block 306 and extending into next time block 308. If desired, D may change frequencies at the end of time block 306, or may, as shown, extend across the end of the time block 306 using the same frequency. C then acknowledges the signal after the end of the data signal from D, again using the second individual frequency sequence 302.

As shown, G joins the network in time block 310. G listens at a single frequency, as indicated by the fill pattern, waiting to hear a communication in the single frequency. As shown at time 312, a communication occurs between C and D—this time an RTS/CTS exchange along the common frequency sequence 300. When G hears a communication between other devices in the network, G is able to synchronize in time with the rest of the network, because at least one of the RTS/CTS signals will include synchronization information. G also becomes aware of the status of the common frequency sequence 300, allowing G to then follow the common frequency sequence 300. The system time and common frequency sequence information are carried in RTS and/or CTS signals.

G may include a timer set to allow G to time out if no communications are captured at its selected frequency during a predetermined time period. G may time out after some duration of time, when it becomes apparent that G is not receiving signals from the rest of the system. For example, G may have a faulty transceiver, or G may be physically located such that insufficient signal reaches G or the system may be collectively sending few messages.

Figure 8:
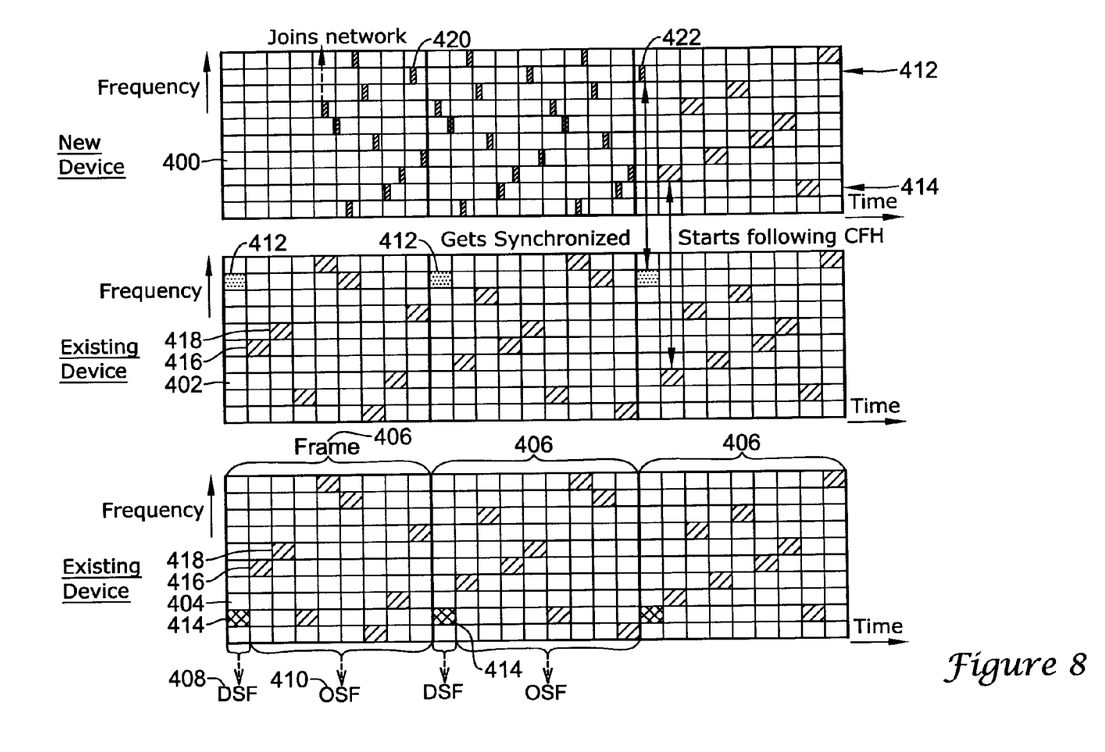
FIG. 8 is a timing chart for a second discovery method.

FIG. 8 is a timing chart for a second discovery method. Separate timing charts are shown, including a new device timing chart 400, a first existing device timing chart 402, and a second existing device timing chart 404. A number of frames 406 are defined. Within each frame 406 there is a discovery subframe (DSF) 408 and an operation subframe (OSF) 410. The DSF 408 is used for enabling a new device to connect to the network. While in the DSF 408, the first existing device listens on a first defined frequency 412, while the second existing device listens on a second defined frequency 414. Preferably, the first defined frequency 412 is different from the second defined frequency 414, though this is not necessary. As a system grows and has more devices, multiple devices may listen on a single frequency during the DSF.

During the OSF 410 of each frame 406, the existing devices follow a common frequency sequence, for example, during the first frame, following the DSF, the existing devices listen on a first frequency 416 and then a second frequency 418, and so forth. When the new device joins the network, it executes a discovery sequence covering a number of frequencies such as frequency 420. The discovery sequence, as shown, may not be time synchronized with the rest of the network, and may include a relatively short burst of information. During each DSF, the existing devices listen for a signal from any new device. As shown at 422, the discovery sequence of the new device overlaps the listening frequency 412 for the first existing device during an OSF. When the first device detects the output of the new device at the listening frequency 412 for the first device during an OSF, the first device will respond with synchronization information and data related to the common frequency sequence being followed during the OSFs. If desired, the first device may further identify its discovery subframe listening frequency 412, or, if the first device has data indicating the discovery subframe frequencies of other devices, several or all of the frequencies already in use in discovery subframes, such that the new device may choose a different listening frequency for use during the DSFs.

Those skilled in the art will recognize that the present invention may be manifested in a variety of forms other than the specific embodiments described and contemplated herein. Accordingly, departures in form and detail may be made without departing from the scope and spirit of the present invention as described in the appended claims

What is claimed is:

1. A transmitter initiated wireless communication system comprising a plurality of peer communication devices configured for sending and receiving signals wirelessly wherein:
   the peer communication devices follow a first channel succession defining a number of communications channels to which the communication devices are tuned at particular times;
   a first peer communication device generates a request to send data to a second peer communication device using a first channel in the first channel succession, wherein the first peer communication device generates the request to send data when the first peer communication device is ready to send data;
   the second peer communication device receives the request to send data from the first peer communication device and generates a clear to send data message to the first peer communication device using the first channel succession;
   the first and second peer communication devices follow a second channel succession to perform data transfer between the first peer communication device and the second peer communication device, wherein the second channel succession is different from the first channel succession; and
   after the data transfer between the first peer communication device and the second peer communication device is completed, the first and second peer communication devices return to following the first channel succession.

2. The system of claim 1 wherein the peer communication devices in the system are further configured such that, when a new device is added to the system, the new device defaults into a discovery mode wherein the new device learns the system timing and the state of the first channel succession.

3. The system of claim 2 wherein the device that is added to the system observes a selected channel from among the number of communications channels for a period of time predetermined to assure that the peer communication devices will use the observed channel during the period of time.

4. The system of claim 2 wherein the device that is added to the system follows a third channel succession in the discovery mode, the third channel succession changing channels more quickly than the first or second channel successions.

5. The system of claim 2 wherein the device that is added to the system transmits hailing messages on succession of channels until a response is received or a time out is observed.

6. The system of claim 1 wherein the first and second channel successions are pseudo-random frequency hopping spread spectrum successions.

7. The system of claim 1 wherein the first and second channel successions are CDMA successions.

8. The system of claim 1 wherein the second channel succession is defined by the second peer communication device.

9. The system of claim 7 wherein data indicative of the second channel succession is communicated by the second peer communication device to the first peer communication device as part of the clear to send data message.

10. The system of claim 1 further comprising a central time device, wherein the central time device periodically generates a time synchronization signal.

11. The system of claim 10 wherein the first and second peer communication devices are each located a number of hops from the central time device, wherein one of the first or second peer communication device is a closer device with respect to the central time device, wherein, during communication between the first and second peer communication devices, a time synchronization signal is generated by the closer device and communicated to the other device.

12. The system of claim 1 wherein the second channel succession is defined by the first peer communication device.

13. The system of claim 12 wherein data indicative of the second channel succession is communicated by the first peer communication device to the second peer communication device as part of the request to send data message.

14. The system of claim 1 wherein at least one of the plurality of peer communication devices is configured to send a broadcast message to the other peer communication devices using a channel defined in the first channel succession.

15. The system of claim 1 wherein the first peer communication device performs a clear channel assessment on the first channel before sending the request to send message.

16. The system of claim 1 wherein:
   a third peer communication device generates a request to send data message to a fourth peer communication device using the first channel after the first and second peer communication devices generate their respective request to send data and clear to send data messages on the first channel;
   the fourth peer communication device generates a clear to send data message in response to the request to send data message from the third peer communication device; and
   data is transmitted by the third peer communication device to the fourth peer communication device using a channel defined in a third channel succession.

17. The system of claim 16 wherein one of the third or the fourth peer communication device defines the third channel succession.

18. The system of claim 16 wherein the third peer communication device performs a clear channel assessment on the first channel before transmitting the request to send message.

19. A transmitter initiated wireless communication system comprising a number of peer devices configured to generate requests to send data when data is ready to send, the devices in the system configured to follow a first channel succession when not transmitting data, wherein, when a first device is prepared to send data, the first device addresses a request to send data to a second device using the first channel succession; the second device sends a clear to send data message using the first channel succession to the first device in response to the request to send data, the clear to send data message including a second channel succession determined by the second device for transmitting data; and the first and second devices follow the second channel succession when transmitting data, the second channel succession being different from the first channel succession.

* * * * *